United States Patent [19]
Devaud et al.

[11] Patent Number: 5,560,248
[45] Date of Patent: Oct. 1, 1996

[54] SYSTEM FOR THE ASSISTED SELECTION OF THE RATIOS OF AN AUTOMOBILE GEARBOX

[75] Inventors: Gérard Devaud, Paris; Serge Grand, Villebon, both of France

[73] Assignee: S.A.M.M. Societe D'Applications Des Machines Motrices, Bievres, France

[21] Appl. No.: 559,684

[22] Filed: Nov. 15, 1995

Related U.S. Application Data

[62] Division of Ser. No. 271,443, Jul. 7, 1994.

[30] Foreign Application Priority Data

Jul. 8, 1993 [FR] France .................... 93 08429

[51] Int. Cl.⁶ .................................................. F16H 59/00
[52] U.S. Cl. ................................ 74/335; 74/477; 477/138
[58] Field of Search ..................... 74/335, 477; 477/127, 477/131, 138; 91/183, 188; 251/31

[56] References Cited

U.S. PATENT DOCUMENTS

| | | |
|---|---|---|
| 3,793,898 | 2/1974 | Espenschied et al. . |
| 4,391,181 | 7/1983 | Weirich et al. ............ 251/31 X |
| 4,467,833 | 8/1984 | Satterwhite et al. .......... 251/31 X |
| 4,993,285 | 2/1991 | Asayama et al. . |
| 5,044,216 | 9/1991 | Steeby et al. . |
| 5,092,200 | 3/1992 | Asayama et al. . |
| 5,249,476 | 10/1993 | Zaiser et al. ................ 74/335 |
| 5,437,204 | 8/1995 | Person ........................ 74/335 |
| 5,438,887 | 8/1995 | Simmons ..................... 74/335 |

FOREIGN PATENT DOCUMENTS

| | | |
|---|---|---|
| 403787 | 12/1990 | European Pat. Off. . |
| 2214248 | 8/1989 | United Kingdom . |

*Primary Examiner*—Charles A. Marmor
*Assistant Examiner*—Peter Kwon
*Attorney, Agent, or Firm*—Sughrue, Mion, Zinn, Macpeak & Seas

[57] ABSTRACT

This assisted selection system comprises an electrohydraulic actuator (12) which controls the input element of the gearbox and may itself be controlled by parameters provided by the engine control computer. The actuator (12) comprises a group of solenoid valves (34, 35, 37, 52, 53) connected to cylinders (15, 16, 41, 42) controlling a fork selecting shaft (13). The cylinders (15, 16) may cause the rotation of the shaft (13) by means of a rocker (14) for selecting the fork corresponding to the chosen ratio, and cause the shaft (13) to move in translation so as to engage the chosen ratio by displacement of the selected fork. This automatic selecting system, which is also applicable to gearboxes of the barrel type, permits, when coupled with the engine control computer, the driver to avoid effecting the declutching and clutching operations, while enabling him to fully master his selection of the speed, if he desires, with no loss due to slip.

6 Claims, 8 Drawing Sheets

SYSTEM FOR THE ASSISTED SELECTION OF THE RATIOS OF AN AUTOMOBILE GEARBOX

This is a Divisional of application Ser. No. 08/271,443 filed Jul. 7, 1994.

BACKGROUND OF THE INVENTION

The present invention relates to a system for the assisted selection of the ratios of a gearbox or transmission, in particular on an automobile vehicle, this gearbox being provided with an input element movable in rotation and translation or solely in rotation, for effecting the chosen selection.

Various conventional types of gearboxes are known among which may be mentioned the following: electromagnetic gearboxes equipped with an electromagnet and selecting epicyclic reduction gears, gearboxes having a pneumatic preselection used in particular on buses, transfluid gearboxes with a hydraulic coupling, hydraulically controlled gearboxes with a hydraulic directional control valve on the steering wheel.

The gearbox having a hydraulic coupling and an automatic or a semi-manual selection has taken precedence over the other structures. These gearboxes without a supplementary device have losses due to slip.

Patent GB-A-2,214,248 discloses a mechanism having controlled cylinders in which the command for achieving the required position is the resultant of a calculation carried out via an electronic control system, between an instruction the level of which is pre-established electrohydraulically and a position of rest.

The various positions to be obtained with respect to the speeds to be engaged result from the association of a proportional solenoid valve, a cylinder, a displacement sensor and an electronic device. It therefore concerns an electrohydraulic position control which has the major drawback, in such an application, of positioning the cylinder in an indeterminate manner in the event of a simple, and in particular an electric breakdown.

Semi-automatically controlled gearboxes to which the present invention relates have no hydrodynamic coupling. Their efficiency is solely that of the gear train of a traditional gearbox. The selection is effected by one of the following means:

1) by action on the shifting forks (linear selection),
2) by action on a rotary barrel,
3) by action on a linkage (rotolinear system).

In respect of these three known selecting modes, the actuation is hydraulic. But these devices present various drawbacks. Thus, the linear selection by action on the forks (the aforementioned selection 1)) requires many solenoid valves, namely two solenoid valves per cylinder, or a permanent return force which is hydraulic (application of the pressure on a differential section) or mechanical (spring); these other arrangements result in an increased dimension of the solenoid valves (doubling the actuating forces ). The safety of the gearbox depends on the reliability of the system employing positive inhibitions which makes it impossible to engage two ratios at the same time. This solution is therefore both complex and expensive.

Actuation by a rotary barrel provides the selection and the positive inhibitions but requires a mechanical element for converting the rotary motion into linear motion which may be difficult to produce.

Depending on the architecture of the gearbox and the number of the speeds, the forks are shifted by one, two or three shafts.

SUMMARY OF THE INVENTION

According to the invention, the system for the assisted selection of the ratios of a gearbox comprises an electrohydraulic actuator controlling the input element which may itself be controlled by parameters delivered by the engine control computer or calculator.

The invention therefore provides a novel mode of achieving the shifting the speed change forks of a conventional gearbox, the architecture of which is not modified, while rendering the speed changes automatic.

The use of such an automatic selection system on a private vehicle intended for the general public permits, when coupled with the engine control computer (controlling among other things the injection and the ignition), the driver to avoid effecting the declutching and clutching operations, while enabling him to fully master his selection of the speed, if he desires, with no loss due to slip.

Also according to the invention, the actuator comprises a group of binary or bistable solenoid valves connected to cylinders controlling the input element of the gearbox in translation and in rotation or solely in rotation, in accordance with the instructions received from the driver via the computer. Thus, depending on the type of the gearbox, the motion may be either rotolinear, while keeping all or part of the control linkage, or solely rotary when the input forks of the gearbox are exclusively shifted by means of a rotary barrel.

In any case, apart from the aforementioned electrohydraulic actuators, the engagement and the disengagement is accompanied by a clutch control. The latter may be in particular of the type having a double input, namely a control via the pedal, or a control via a solenoid valve which acts in parallel and selectively on the clutch cylinder.

BRIEF DESCRIPTION OF THE DRAWINGS

Further features and advantages of the invention will be apparent from the following description of two embodiments of the invent ion shown in the accompanying drawings and given by way of non-limitative examples.

DETAILED DESCRIPTION OF THE PREFERRED EMBODIMENTS

Figure 1:
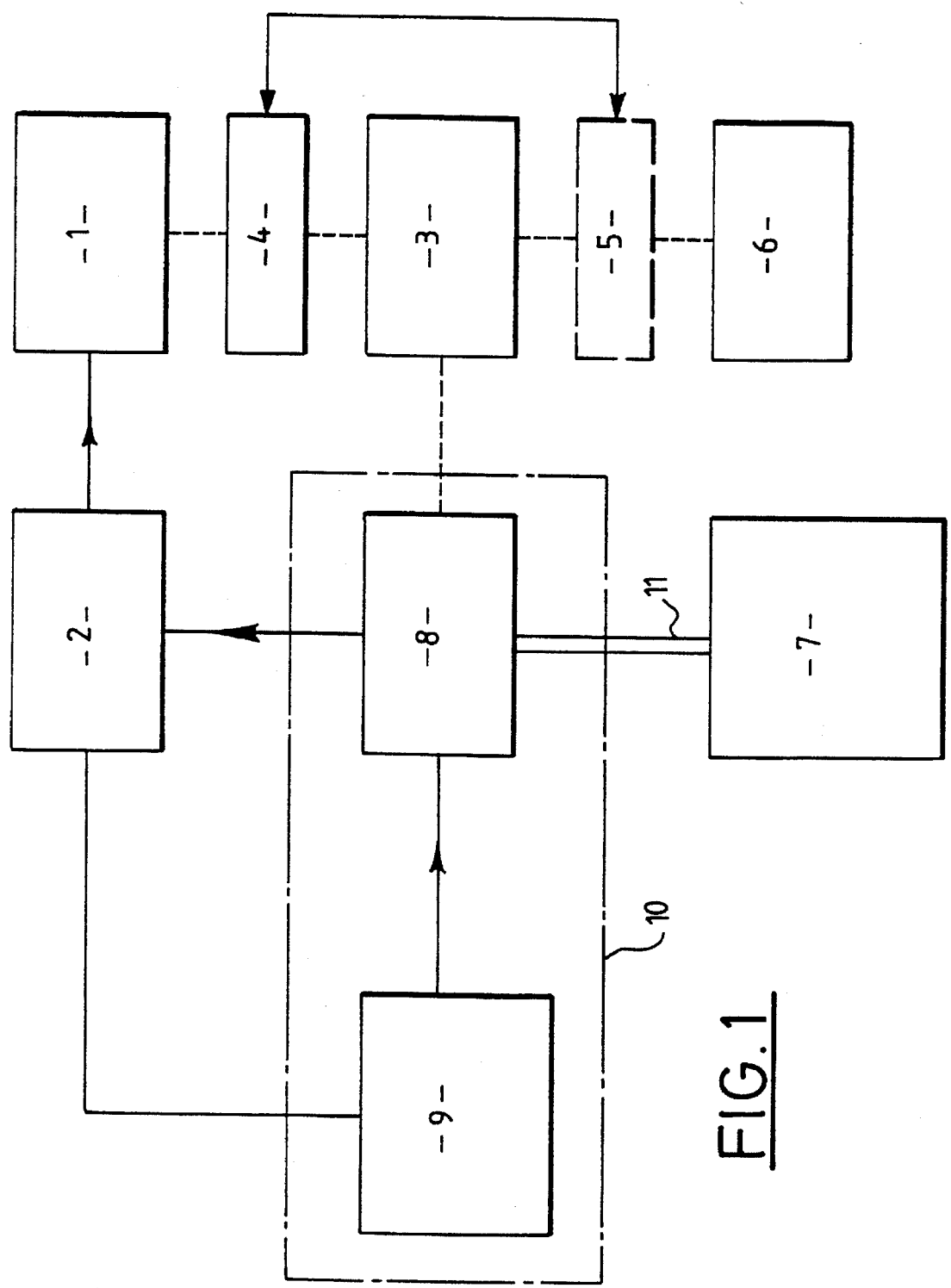
FIG. 1 is a block diagram of a gearbox-engine unit of a vehicle incorporating the assisted selection system according to the invention.

The block diagram of FIG. 1 illustrates the organization of a circuit of a vehicle in which is inserted the system for the assisted selection of the ratios of a gearbox or gearbox to which the invention relates.

This circuit comprises an engine 1, connected to an injection and ignition computer or calculator 2, a gearbox 3, a clutch the positions 4 and 5 of which are represented on each side of the gearbox 3, driving wheel s 6 connected to the gearbox, a high pressure hydraulic generator 7 of the vehicle, and an electrohydraulic actuator 8 connected, on one hand, to the gearbox 3, and, on the other hand, to an ergonomic speed control interface 9 which is capable of delivering commands through the actuator 8. This interface 9 is itself connected to the computer 2 which is capable of delivering the parameters of the engine 1 thereto.

The actuator 8 and the interface 9 constitute a subassembly 10 which more precisely constitutes the subject matter of the present invention. The actuator 8 is connected to the hydraulic generator 7 through a hydraulic connection 11, the gearbox 3 is connected to the two positions 4, 5 of the clutch, to the driving wheels 6 and to the engine 1 through mechanical connections shown in dotted lines. The other connections of the circuit (between the actuator 8, on one hand, the computer 2 and the interface 9, on the other hand, between the computer 2 and the interface 9, and between the computer 2 and the engine 1) are electric.

Figure 4:
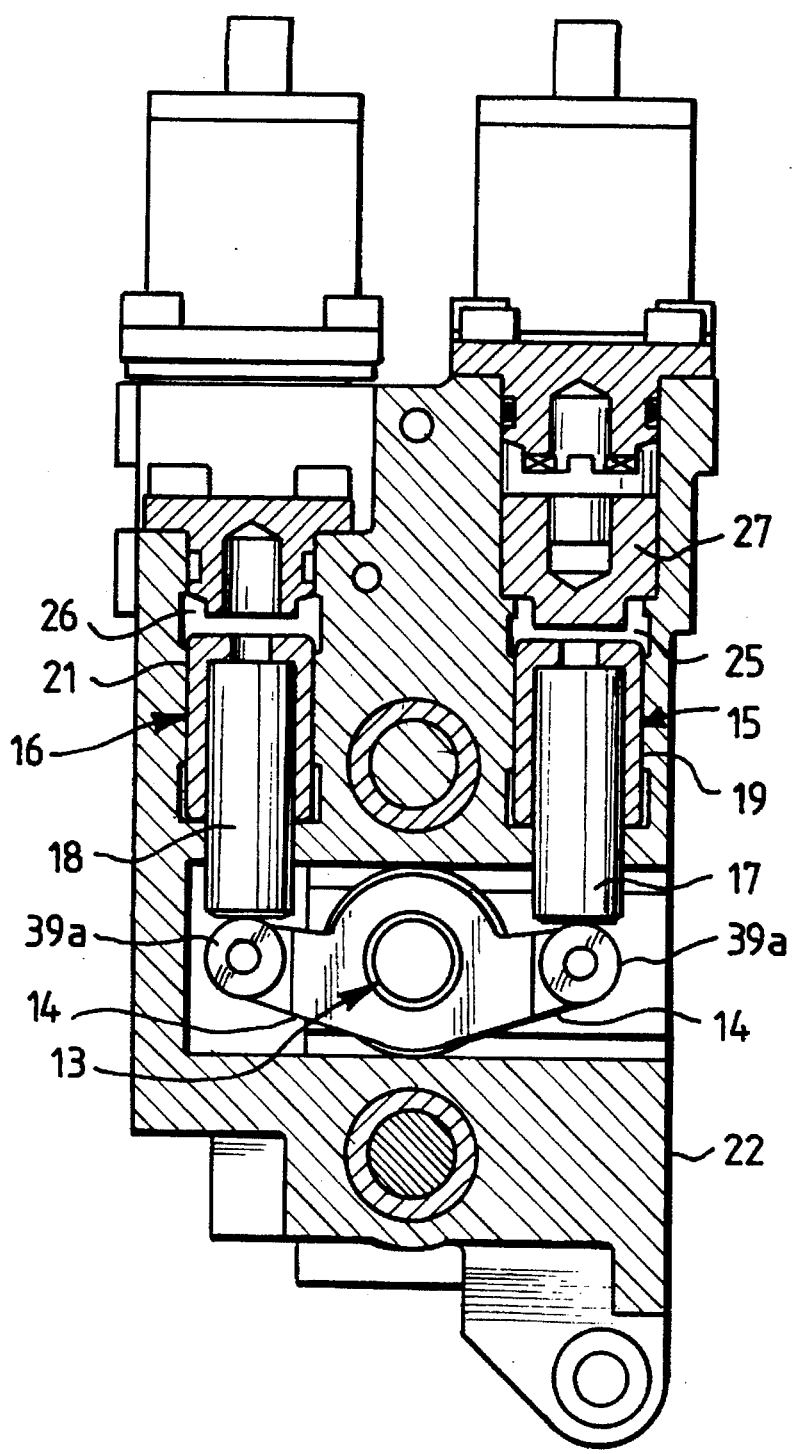
FIG. 4 is a cross-sectional view taken on line 4—4 of FIG. 3.
Figure 5:
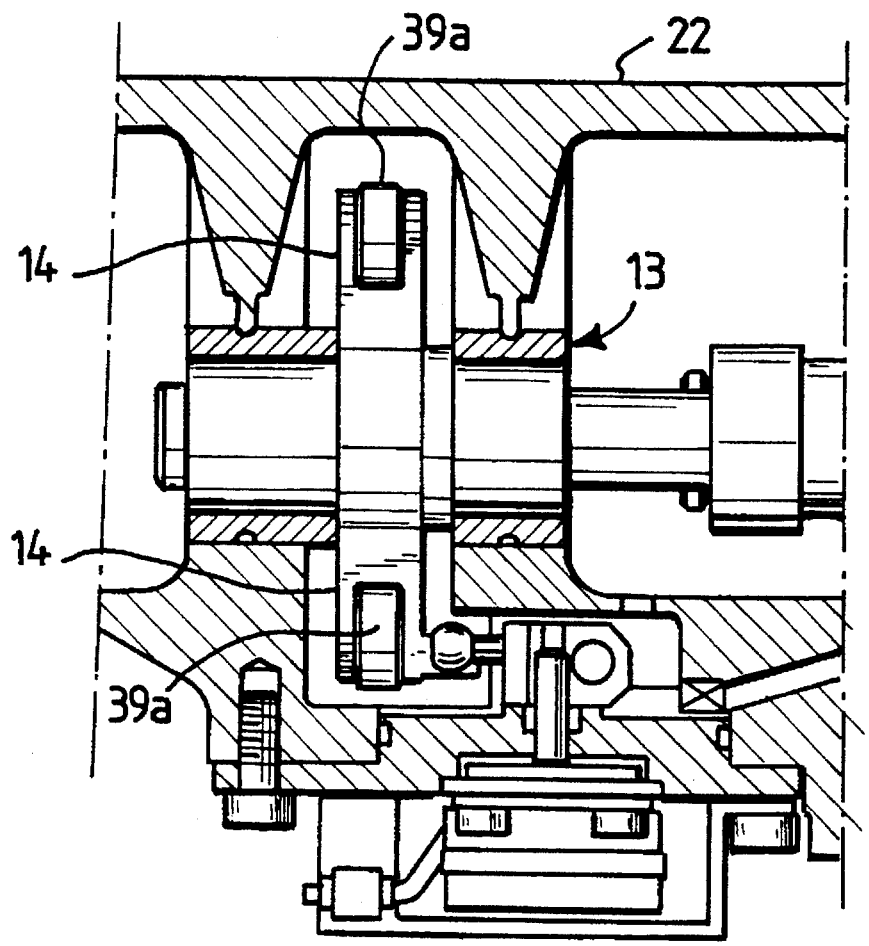
FIG. 5 is a partial axial sectional view of FIG. 3.
Figure 6:
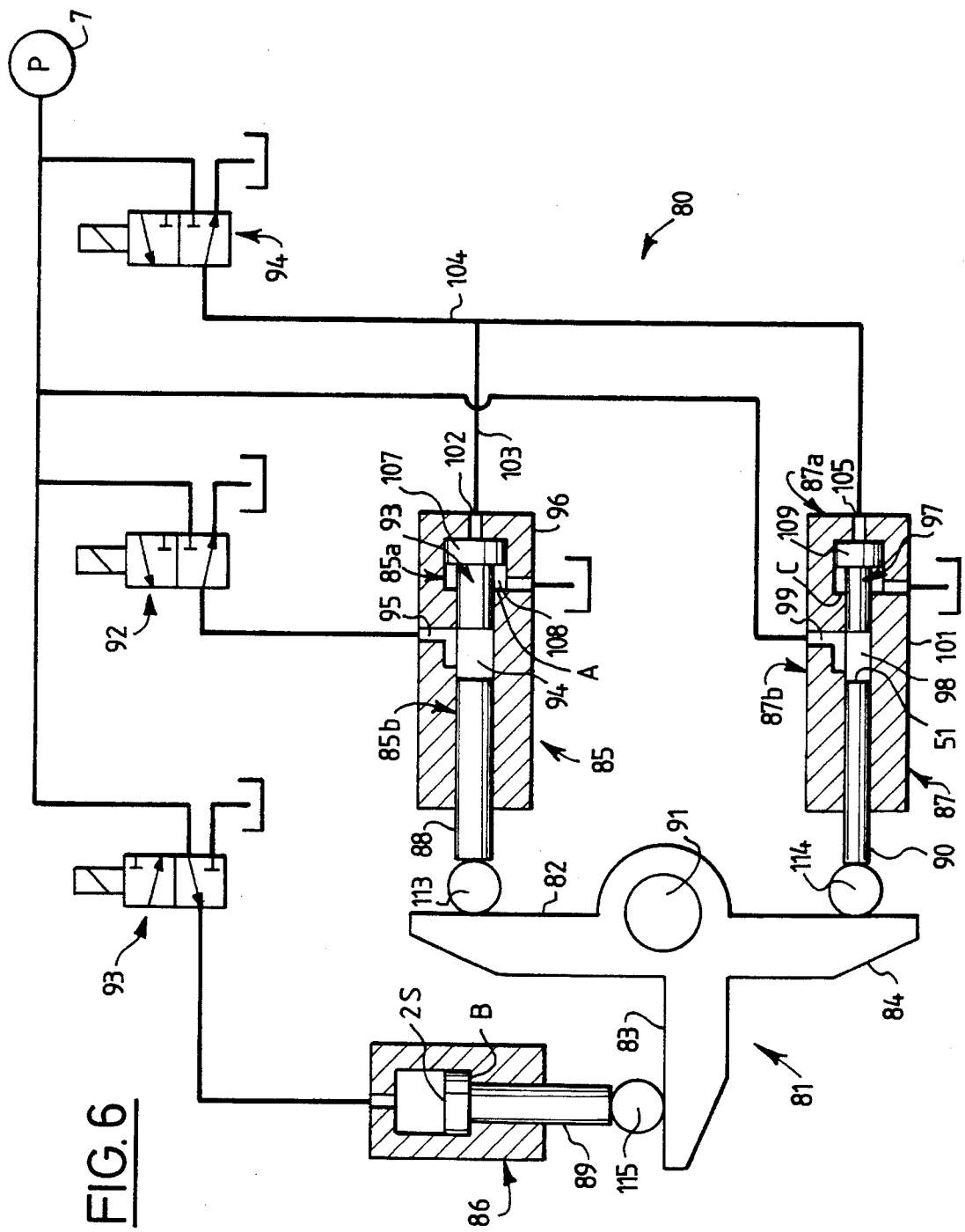
FIG. 6 is a diagrammatic view of a second embodiment of the electrohydraulic actuator according to the invention, adapted to produce a solely rotary motion for controlling a gearbox of the type having an input rotary barrel.
Figure 7:
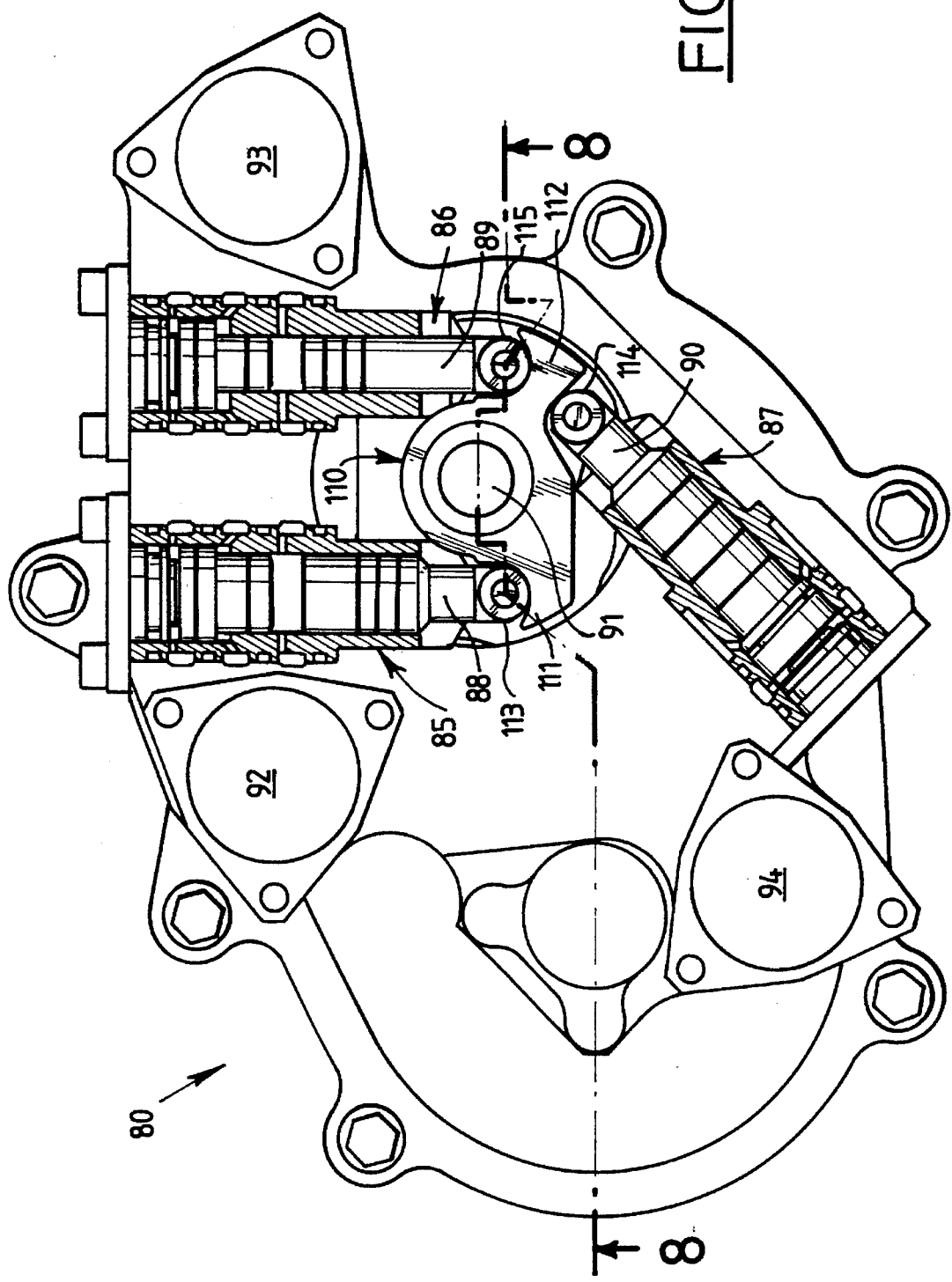
FIG. 7 is a half-elevational and half-sectional view of a solely rotary electrohydraulic actuator corresponding to the embodiment shown in FIG. 6.
Figure 8:
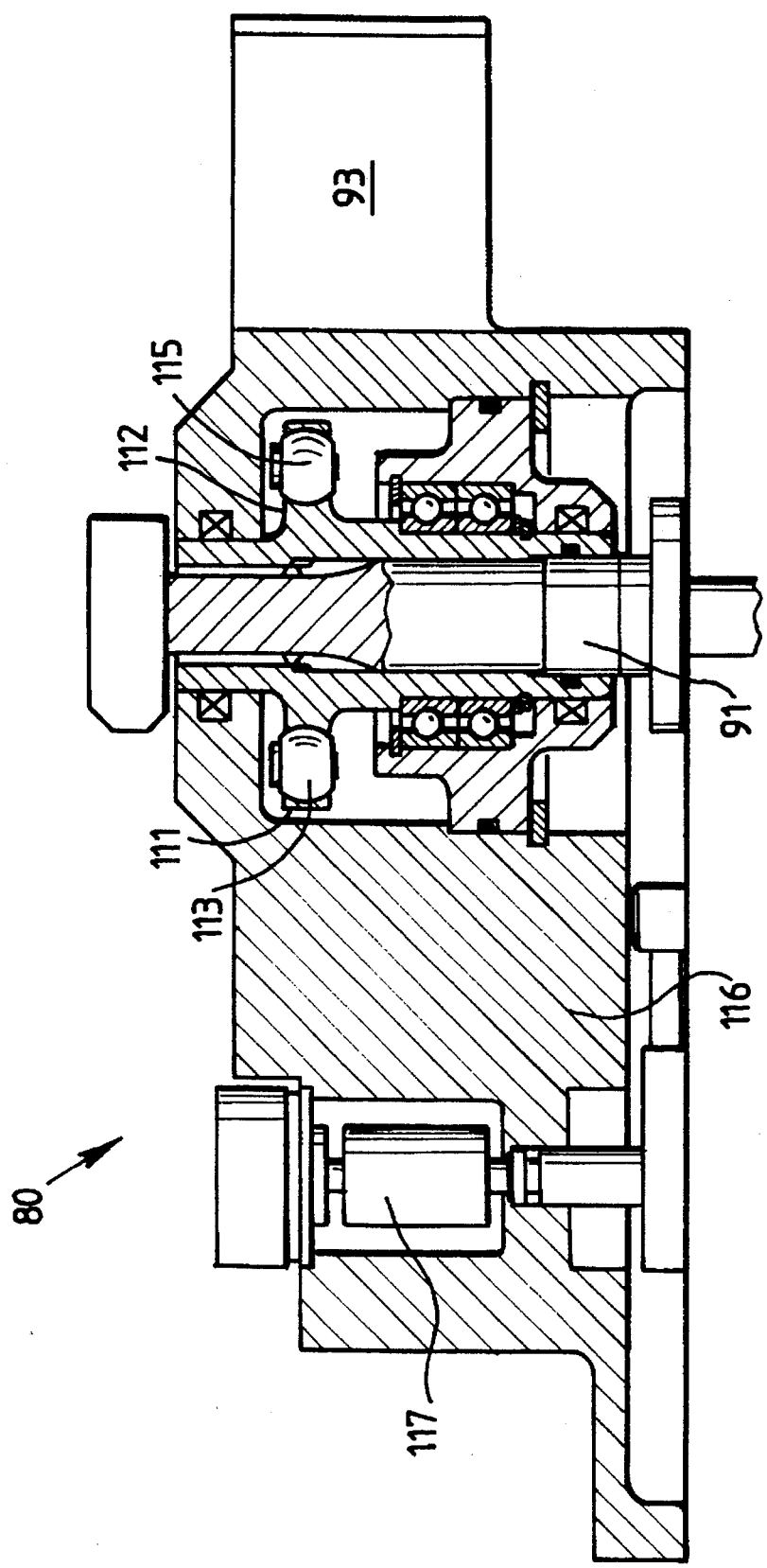
FIG. 8 is a top plan view of the actuator, partly in section on line 8—8 of FIG. 7.

The electrohydraulic actuator 8 may be either of the rotolinear motion type as shown in FIGS. 2 to 5, or solely of a rotary motion type (FIGS. 6 to 8). The actuator 8 controls the input element of the gearbox 3, it being possible to control this input element by parameters delivered by the computer 2.

Description of the rotolinear electrohydraulic actuator shown in FIGS. 2 to 5

The electrohydraulic actuator shown in FIGS. 2 to 5 is mechanically connected to the gearbox 3 through an interface constituted by a control shaft 13 equipped in its central region with two lateral wings 14. The shaft 13 therefore constitutes the input element of the gearbox 3 which incidentally is of the fork control type (these forks not being shown as they are known per se). The rotation off the shaft 13 selects the fork corresponding to the chosen ratio while its movement in translation engages the chosen ratio by the shifting of the selected fork.

The actuator 12 comprises two opposed hydraulic cylinders 15, 16 which cause the rotation of the rockers, formed by the two lateral wings 14, mechanically fixed to the shaft 13 proper. These two cylinders 15, 16 are located on each side of the shaft 13 and each cooperate with a lateral arm or wing 14 of the rocker. Each cylinder 15, 16 comprises a respective piston 17, 18 surrounded by a corresponding cup 19, 21 to which it is connected and which is movable in translation in the body 22, 23 of the cylinder 15, 16 between two end positions of abutment. The inner ends of the cups 19, 21 on the side remote from the ends of the pistons 17, 18 engaged with the rocker 14 are provided with ports 24 opening onto a hydraulic chamber 25, 26 which may be supplied with fluid under pressure. The cylinder 15 is provided, at the end of its chamber 25 remote from the piston 17, with a stop 27 which is disposed in a cavity 28 in the extension of the chamber 25 and is movable between two end positions of abutment. One of the opposite faces of the stop 27, namely its face 29 which is the closest to the cup 19, forms a movable end wall of the, hydraulic chamber 25.

A port 31 is provided in the body 22 of the cylinder 15 and opens onto the hydraulic chamber 25, while a second port 32 also provided in the body 22, opens onto the face 33 of the stop 27 remote from the face 29 defining the chamber 25. The two ports 31, 32 are connected to respective hydraulic supply solenoid valves 34, 35 for effecting the displacement of the stop 27 in its cavity 28. The movable stop 27 has a T-shaped section whose transverse branch 27a remote from the piston 17 is slidable between two end positions in the cavity 28 whose section is larger than that of the chamber 25. The longitudinal branch 27b, which constitutes the foot of the T, has a section equal to that of the chamber 25 in which it is slidable between a retracted first position shown in FIG. 2 in which it uncovers the supply port 31 of the chamber 25 and corresponds to the reverse speed (RS shown in FIG. 2 above the lever 13), and an advanced second position in which it closes this port 31. This forward position only permits the selection of the other speeds, namely speeds 1, 2, 3, 4, 5 and 6 in the case of a 6-speed gearbox.

The second cylinder 16 is devoid of a stop such as 27 and its chamber 26 is supplied through a conduit 36 connected to a binary solenoid valve 37, by means of a port 38 provided in the body 23 of the cylinder 16 in facing relation to the cup 21.

The pistons 17, 18 of the two cylinders 15 and 16 are in engagement with the arms 14 of the rocker through any suitable means such as rollers 39 mounted on the ends of the pistons 17, 18.

The pair of cylinders 15, 16 and the rocker formed by the lateral arms 14 therefore permit rotating the shaft 13 about its axis through an angle chosen by the selector of the fork corresponding to the ratio to be obtained.

Description of the translation cylinders 41 and 42

Figure 2:
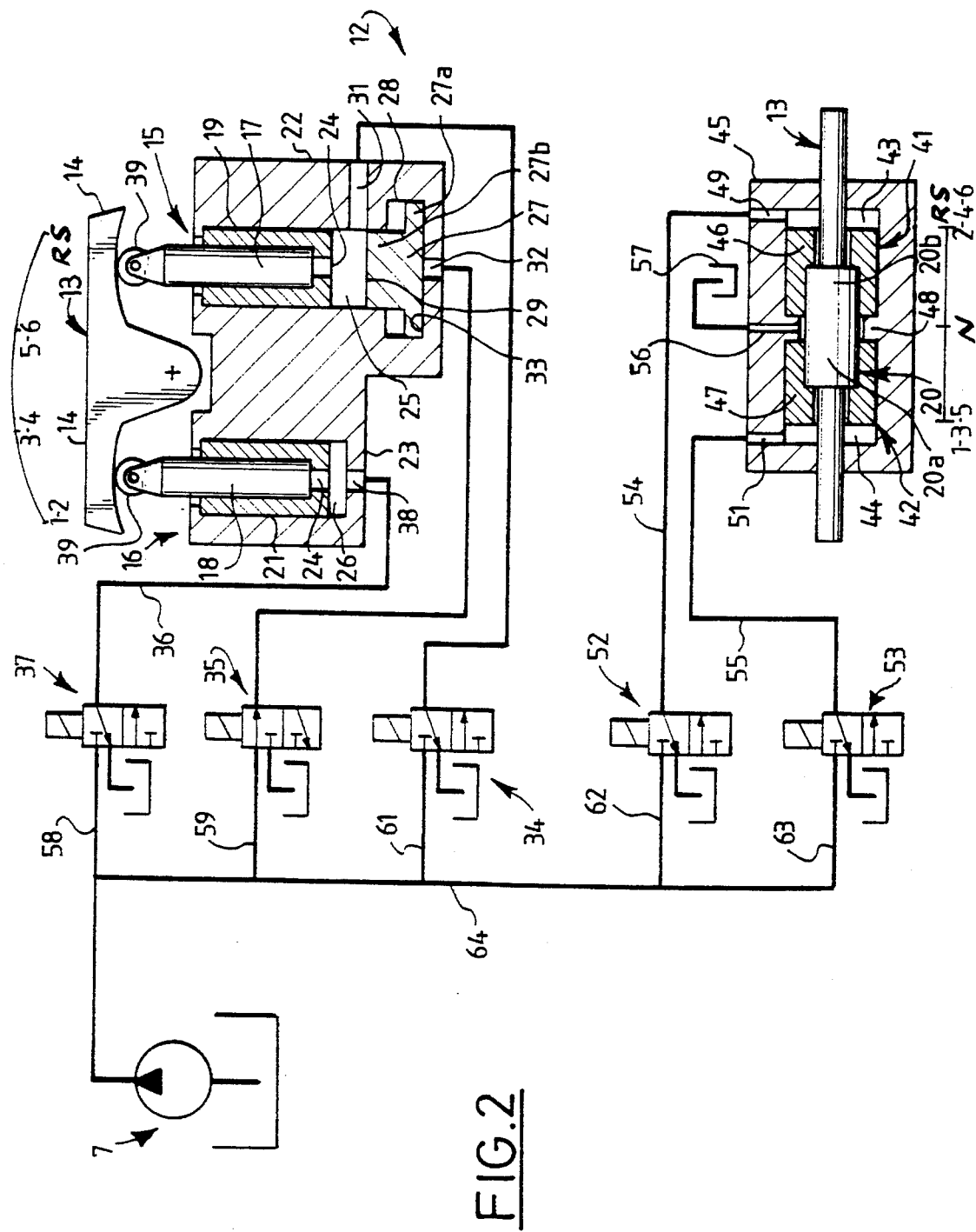
FIG. 2 is a simplified diagram of a first embodiment of the assisted selection system according to the invention adapted to produce a rotolinear motion.

The rotolinear actuator 12 further comprises two opposed cylinders 41, 42 disposed coaxially with the control shaft 13 and mechanically connected to the latter so as to be movable in translation from a central position shown in FIG. 2 to either one of two opposed end positions in respective chambers 43, 44 provided in a cylinder body 45. Each cylinder 41, 42 comprises a cup 46, 47 through which the shaft 13 extends axially, there being mounted in these cups two pistons 20a, 20b forming a double piston in one piece extending in the two cups. Each cup 46, 47 is slidable in its respective chamber 43, 44 between a first position of abutment against an interposed shoulder 48 corresponding to the dead centre central position, and a second position of abutment corresponding, for one of the cylinders 41, 42, to the even speeds, and, for the other cylinder, to the odd speeds. Ports 49, 51 are provided in the body 45 for respectively supplying fluid to the chambers 43 and 44 and are connected to respective solenoid valves 52, 53 through conduits 54, 55.

The opposite faces 20a, 20b of the double piston 20 constituting two opposed pistons are capable of abutting against the corresponding shoulders of the cups 46, 47 either simultaneously in the central position (shown in FIG. 2), or alternately when the shaft 13 and the piston 20 move in one direction or the other under the effect of the hydraulic pressure in one of the chambers 43, 44 while the other chamber is connected to the discharge to the sump by a suitable positioning of the corresponding solenoid valve 52 or 53.

The shoulder 48 formed around the double piston 20 and defining the chambers 43, 44 is provided with a conduit 56 connected to a hydraulic tank 57 (sump). The five solenoid valves 34, 35, 37, 52, 53 of a well-known binary type which require no description are all shown in their position of rest. They are supplied with hydraulic fluid through respective conduits 58, 59, 61, 62, 63 forming as many parallel branch connections communicating with a main conduit 64 which is connected to the hydraulic generator 7.

The piston 20b is capable of abutting in the cup 46 and the piston 20a is capable of abutting in the cup 47, against corresponding shoulders provided in these cups. Consequently, when the shaft 13 is driven in translation toward the cup 46, the latter is also driven by the piston 20b fixed to the shaft 13, while the piston 20a slides inside the cup 47 which remains in its position shown in FIG. 2 of abutment against the interposed shoulder 48. Inversely, if the shaft 13 is driven in the opposite direction, the piston 20a shifts the cup 47 until it reaches a position of abutment at the entrance of the chamber 44 and closes the port 51, while the cup 46 remains in its position of abutment against the central shoulder 48. The movement in translation of the shaft 13 in either direction engages the speed ratio by displacement of the fork selected by the preliminary rotation caused by the actuation of the cylinders 15 and 16.

Operation of the electrohydraulic actuator 12

Movement in rotation

The actuator 12 must provide four different positions in rotation. The cups 17, 18 provide the central position while the retractable movable stop 27 permits obtaining the offset position of the reverse speed. Indeed, if fluid under pressure is sent through the port 32 by the solenoid valve 35, while, as shown in FIG. 2, the solenoid valve 34 no longer sends fluid under pressure to the chamber 25, the stop 27 is displaced from the inner end of its cavity 28 toward the piston 17 until it reaches a position of abutment by its lateral branch 27a against the opposite face of the cavity 28, while its foot 27b closes the port 31. In this raised position of the stop 27, the rocker 14 is therefore limited to the speeds 5 and 6. On the other hand, when the stop 27 is lowered and uncovers the port 31 and comes into contact by its face 33 with the inner end of the cavity 28, the rocker 14 can move to a position corresponding to the reverse speed.

Selection of the fork 1-2

The chamber 26 facing the piston 18 is connected to the sump of the solenoid valve 37, the chamber 25 facing the piston 17 is supplied with the hydraulic supply pressure. Under the effect of the force exerted by the piston 17, the rocker 14 turns and drives the piston 18 to a position of abutment of the cup 21 against the inner end of the chamber 26 in which the port 38 is provided.

Selection of the fork 3-4

The selection of the fork 3-4 is obtained by the recentring of the rocker 14. Each of the chambers behind each piston 17, 18 is connected to the supply pressure. The cup 21 is in a position of abutment against the end of the chamber 26 remote from the port 38 (as shown in FIG. 2), and the cup 19 is also in a position of abutment against the end of the chamber 25 remote from the stop 27 thereby maintaining the rocker 14 in the central position.

Selection of the fork 5-6

To select the fork 5-6, the chamber 25 in which the piston 17 travels is connected to the discharge to the sump by a suitable positioning of the solenoid valve 34. The chamber 26 in which the piston 18 travels is connected to the supply pressure, as is the chamber constituted by the port 32 in facing relation to the movable stop 27. Under the effect of the force exerted by the piston 18, the rocker 14 urges the piston 17 and the cup 19 to the position of abutment against the face 29 of the stop 27 maintained in the forward position by the bearing of its transverse arm 27a against the face of the cavity 28 opposite the face 33, in which position the stop 27 closes the port 31.

Selection of the reverse speed fork (RS)

The reverse speed fork is selected by a movement similar to the selection of the fork 5-6 except for the movable stop 27 which is in the retracted position, i.e. in which it bears by its face 33 against the inner end of the cavity 28 and uncovers the port 31. The hydraulic pressure is applied in the chamber 26 of the piston 18 while the other two chambers 25 and 32 are connected to the discharge to the sump. The force exerted on the piston 18 drives the rocker 14 which in turn pushes on the piston 17 and the cup 19 to a position of abutment against the face 29 of the movable stop 27 in the retracted position shown in FIG. 2 (in which the stop 27 bears by its face 33 against the inner end of the cavity 28).

Movement in translation

The actuator 12 must provide three different positions of the movement in translation.

Engagement of an odd ratio

The chamber 44 of the corresponding piston 20a (which is part of the previously-described double piston 20) is connected to the discharge to the sump by a suitable actuation of its supply solenoid valve 53. The chamber 43 in front of the second piston 20b (constituting the other part of the double piston 20) is supplied with the supply pressure by a suitable actuation of its solenoid valve 52. Under the effect of the force exerted by the piston 20b, the shaft 13 is displaced and drives the piston 20a to a position in which the cup 47 abuts against the inner end of the chamber 44 in which the cup 47 closes the port 51.

Return to the neutral position

The neutral position (N) is obtained by recentring the control shaft 13. Each of the chambers 43 and 44 behind each piston 20b and 20a is connected to the supply pressure by a suitable positioning of its respective solenoid valve. The cup 47 abuts against the central shoulder 48 and the cup 46 bears against the opposite face of the shoulder 48 and thereby maintains the shaft 13 in the central position as shown in FIG. 2.

Engagement of an even ratio

To engage an even ratio, the chamber 43 behind the piston 20b is connected to the discharge to the sump, the chamber 44 behind the piston 20a is connected to the supply pressure. Under the effect of the force of the piston 20a, the piston 20b pushes the cup 46 to a position of abutment against the inner end of the chamber 43 (toward the right as viewed in FIG. 2) in which this cup closes the supply port 49.

The following points should be mentioned:

Once a speed is engaged, all the solenoid valves 35, 37 . . . 53 are de-energized. In starting at any engaged speed, the neutral position is reached by energizing the solenoid valves 52 and 53. In starting at the neutral position, to reach a given speed it is necessary to:

| Speed | First energize | Then energize |
|---|---|---|
| 1 | 34 | 52 |
| 2 | 34 | 53 |
| 3 | 34 & 37 | 52 |
| 4 | 34 & 37 | 53 |
| 5 | 37 | 52 |
| 6 | 37 | 53 |
| RS | 35 & 37 | 53 |

There will now be described an industrial embodiment of the electrohydraulic actuator 12 with reference to FIGS. 3 to 5.

The control shaft 13 is disposed in a housing 70 and connected to move in translation with either one of the cylinders 41 and 42 (FIG. 3) by respective lateral arms 71 and 72. There will also be noticed the cups 46 and 47 and the corresponding hydraulic chambers 43, 44. The shaft 13 is axially slidable in either direction between the cylinders 41 and 42 owing to the provision of a splined system 73 provided on the shaft 13 and on the corresponding inner face of a coaxial sleeve 74 fixed to the body 45 of the cylinders 41, 42.

Figure 3:
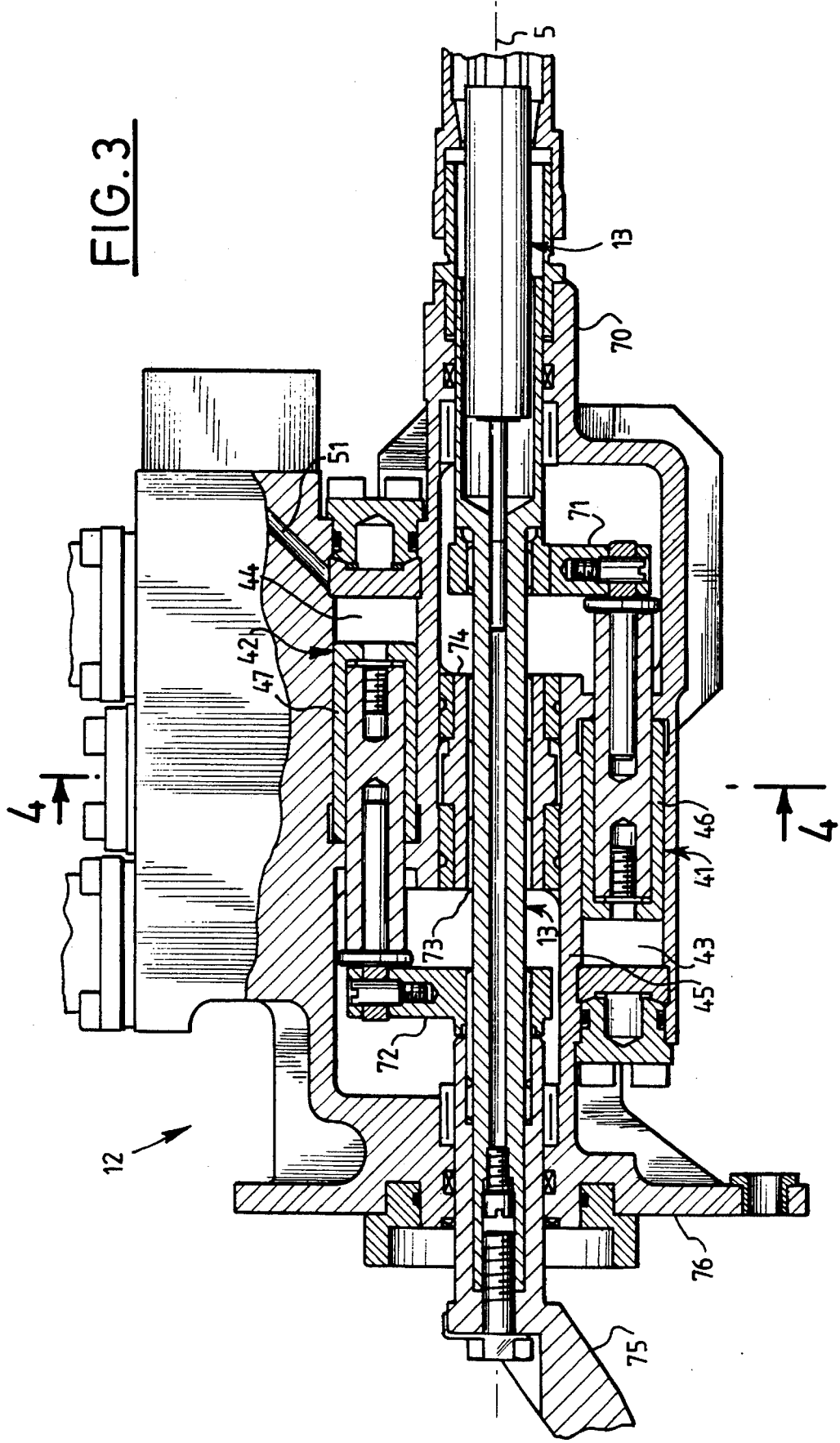
FIG. 3 is a half-longitudinal sectional and half-elevational view of an electrohydraulic actuator of the rotolinear type for operating the assisted selection system diagrammatically represented in FIG. 2.

Further, the shaft 13 has one of its ends fixed to a lever 75 controlling the forks of the gearbox in the known manner (FIG. 3). The body 45 of the cylinders 41, 42 is in one piece at one of its ends with an interface 76 adapted to bear against the gearbox 3. Shown in FIG. 4 are the lateral arms 14 constituting the rocker of the shaft 13, and the end rollers 39a carried by the arms 14 (as an alternative embodiment with respect to the rollers 39 shown in FIG. 2). The rollers 39a bear against the respective pistons 17, 18 of the cylinders 15, 16 for driving the rocker 14 and the shaft 13 in rotation. Also shown are the cups 19, 21, the hydraulic chambers 25, 26 and the movable stop 27 of the cylinder 15, the cylinders and the rocker constituted by the arms 14 being disposed in the body 22.

Description of the rotary electrohydraulic actuator (FIGS. 6 to 8)

The rotary actuator 80 is adapted to effect the rotation of an input barrel (not shown) of the gearbox 3. The rotary element driving the barrel is here a rocker 81 having three arms 82, 83, 84 of which two (82 and 84) are in the extension of each other and the third 83 is perpendicular to the other two. The actuator 80 comprises three hydraulic cylinders 85, 86, 87 of which the respective pistons 88, 89, 90 are engaged with a corresponding arm 82, 83, 84 so as to position the control shaft 91, fixed to the rocker 81, in the angular position related to the chosen speed.

The cylinders 85, 86, 87 are actuated by respective solenoid valves 92, 93, 94 which may be controlled by commands delivered by the engine computer 2.

Two of the three cylinders, namely in the embodiment shown in FIG. 6, the cylinders 85 and 87, are each double cylinders constituted by two single-acting cylinders (85a nd 85b; 87a, 87b) disposed in series, the third cylinder (86) being a single-acting cylinder. The two pistons 88 and 93 of the double cylinder 85 are in alignment and separated by an intermediate hydraulic chamber 94 supplied by the binary (on-off) solenoid valve 92 through a port 95 in the body 96 of the cylinder 85. Likewise, the two pistons 90 and 97 of the double cylinder 87 are in alignment and separated by a hydraulic chamber 98 supplied, through a port 99 in its body 101, by the hydraulic pressure generator 7 whereby it is possible to displace the piston 90 and consequently turn the rocker 81 by bearing against the arm 84. Provided in the body 96 of the cylinder 85 is a port 102 which communicates with a conduit 103 opening onto a pipe 104 connected, on one hand, to the binary (on-off) solenoid valve 94 and, on the other hand, to a port 105 for admitting hydraulic fluid into the cylinder 87a of the double cylinder 87 in front of the piston 97.

In one of the double cylinders 85, 87, namely in the illustrated embodiment the cylinder 85, the piston 93 which is not in contact with the rocker 81 has a section 2S larger than the section S of the other piston 88. This section 2S is that of the head 107 of the piston 93 which is capable of abutting at the end of its travel against the inner end of the corresponding hydraulic chamber 108. The first piston 90 of the second double cylinder 87 has a section $S_1$ smaller than the section S of the corresponding piston 88 of the other double cylinder 85. The piston 89 of the cylinder 86 has a section 2S. The second piston 97 of the double cylinder 87 has a head 109 whose section is smaller than the section 107 of the corresponding piston 93 of the double cylinder 85. Lastly, the sections of the pistons of the three cylinders 85, 86, 87 and the positions of the binary solenoid valves 92, 93, 94 in their state of rest are so determined that the passage of the solenoid valves to the energized state by the command of the computer 2, effects a rotation of the rocker 81, and therefore of the barrel of the gearbox, through an angle corresponding to the selected speed.

The different possible angular positions of the rocker 81 are given as a non-limitative example in the following table as a function of the state of the solenoid valves 92, 93, 94, either at rest (R), or energized (E).

| Position | 93 | 92 | 94 |
|---|---|---|---|
| 0° | R | R | R |
| 15° | R | E | R |
| −15° | E | R | R |
| 7.5° | R | E | E |
| −7.5° | E | R | E |

R: Solenoid valve at rest
E: Solenoid valve energized

R : Solenoid valve at rest

E : Solenoid valve energized

Further, the truth table of the two double cylinders and 87 is as follows:

| U1 | U2 | Piston 88 | Piston 93 |
|---|---|---|---|
| P | P | Extended | Bearing against face A |
| P | $R_0$ | Extended | |
| $R_0$ | P | Retracted, bearing against piston 93 | Bearing against face A |
| $R_0$ | $R_0$ | Retracted, bearing against piston 93 | |

In this table, $R_0$ signifies a discharge to the sump for the utilization 1 (U1) or utilization 2 (U2), P signifying "pressure".

The rocker 81 may have five angular positions, for example (0°; +7.5°; −7.5°; +15° and −15°) in accordance with the state of the three solenoid valves.

Position 0° of the rocker 93 unenergized: pressure established in the cylinder 86 in which the piston 89 abuts against the face B and develops a force P×b 2S.

92 unenergized: no pressure on the piston 88 of the cylinder 85 which does not develop a force.

Piston 90 of the cylinder 87 extended; the intermediate chamber 98 being under pressure, this piston 90 develops a force PS (smaller than that exerted by the cylinder 86) which has for effect to apply the piston 89 of the cylinder 86 against the rocker 81.

Position +7.5° of the rocker 81

93 may be energized or unenergized, since the position +7.5° of the rocker does not depend on that of the cylinder 86.

92 energized: pressure exerted on the piston 88 of the cylinder 85 which develops a force P×2S.

94 energized: piston 97 of the cylinder 87 bearing against the face C of the chamber. The force developed by the piston 97 of the cylinder 87 is greater than P×2S.

The force developed by the piston 90 of the cylinder 87 is smaller than P×2S.

Consequently, the arm 84 of the rocker 81 is maintained bearing against the piston 90 of the cylinder 87 by the cylinder 85 in position 7.5°.

Position −7.5° of of the rocker

93 energized: no force developed by the cylinder 86.

92 unenergized: no force developed by the piston 88 of the cylinder 85.

94 energized: piston 93 of the cylinder 85 bears against the face A and develops a force P×2S; the piston 90 of the cylinder 87 develops a force smaller than P×2S.

Consequently, the branch 82 of the rocker is maintained bearing against the piston 88 of the cylinder 85 by the cylinder 87 in the position −7.5°.

Position +15° of the rocker

93 energized or unenergized.

92 energized: force P×2S developed by the piston 88 of the cylinder 85.

92 unenergized: no force developed on the pistons 93 and 97 of the cylinders 85 and 87.

The piston 88 of the cylinder 85 maintains the arm 84 of the rocker 81 bearing against the piston 90 of the cylinder 87.

Position −15° of the rocker

93 energized: no force developed by the cylinder 86.

92 unenergized: no force developed by the piston 88 of the cylinder 85.

94 unenergized: no force developed by the piston 93 of the cylinder 85.

The piston 90 of the cylinder 87 which develops a force PS maintains the arm 82 of the rocker bearing against the piston 88 of the cylinder 85.

FIGS. 7 and 8 illustrate an industrial embodiment of the rotary electrohydraulic actuator 80. There are shown in particular: the shaft 91 controlling the barrel, the rocker 110 fixed to said shaft and here provided with two radial arms 111, 112 performing the function of the three arms 82, 83, 84. Indeed, if the am 111 cooperates with a single double cylinder 85 (the piston 88 of which is provided with an end roller 113 engaged in a corresponding recess in the arm 111), the second radial arm 112 cooperates on one of its faces with the second double cylinder 87 and on its opposite face with the single-acting cylinder 86 the pistons 90 and 89 of which are also provided with end bearing rollers 114 and 115. The three cylinders 85, 86, 87 are respectively controlled by the solenoid valves 92, 93 and 94. The shaft 91 and the aforementioned components of the actuator 80 are carried by a body 116 provided with a sensor 117 of the angular position of the shaft 91 (this sensor being of a type known per se).

The system for the assisted selection according to the invention employs solely binary ("on-off") solenoid valves controlling cylinders which operate between two positions of abutment.

Consequently, in order to obtain a displacement of a cylinder mechanically defined by the positions of abutment, it is sufficient to deliver an electric pulse of identical value as to duration and level to the binary solenoid valve corresponding to the chosen speed.

The mentioned potentiometers are not involved in the control chain and merely have a checking function. If desired, they may be dispensed with.

The control tables on pages 15 and 19 show that a simple control lever, with no electronic means, permits effecting the desired speed changes.

The connection with the computer of the engine may effect automatic or semi-automatic speed changes, depending on the chosen type of manipulation and/or the sophistication of the vehicle.

"The input element" of the system according to the invention may be controlled either directly by the driver by means of a speed-selecting keyboard, by direct energization of the binary solenoid valves, or automatically by an impulse produced by the driver, or solely as a function of parameters relating to the operation of the engine and the speed of the vehicle with no action on the part of the driver.

In the last two cases, the energizations of the binary solenoid valves are produced by the engine control computer.

What is claimed is:

1. A system for assisted selection of ratios of a gearbox of an automobile vehicle, said gearbox having an input element movable solely in rotation for effecting a selected ratio, said system comprising an electrohydraulic actuator for driving said input element, and said actuator comprising a plurality of cylinders operatively connected to said input element, and a plurality of bistable solenoid valves operatively connected to said cylinders for driving said input element solely in rotation as a function of instructions;

wherein said actuator is a rotary element, and wherein said input element is in the form of a barrel, said rotary element for driving said barrel being a rocker having three arms, and said actuator comprising three hydraulic cylinders and solenoid valves associated with said hydraulic cylinders for actuating said hydraulic cylinders, said three cylinders having pistons in contact with a respective arm of said rocker so as to position said control shaft connected to said rocker in an angular position corresponding to the chosen speed, it being possible to control said solenoid valves by said instructions.

2. System according to claim 1, wherein two of said three cylinders are double cylinders each constituted by two single-acting cylinders arranged in series, said double cylinders having pistons in alignment and separated by an intermediate hydraulic chamber supplied with hydraulic fluid by a solenoid valve, the third cylinder being a single-acting cylinder.

3. System according to claim 1, wherein two of said three cylinders are double cylinders each constituted by two single-acting cylinders arranged in series, said double cylinders having pistons in alignment and separated by an intermediate hydraulic cheer supplied with hydraulic fluid by a hydraulic fluid generator, the third cylinder being a single-acting cylinder.

4. System according to claim 2, wherein in a first of said double cylinders the piston which is not in engagement with said rocker has a section larger than the section of the other piston and is provided with a head which is capable of coming into abutment, at the end of its travel, with the inner end of the corresponding hydraulic chamber.

5. System according to claim 4, wherein a second of said double cylinders comprises a first piston engaged with said rocker and having a cross-section smaller than the cross-section of the corresponding piston of said first double cylinder, while the second piston of said second double cylinder has a cross-section smaller than the cross-section of the corresponding piston of said first double cylinder.

6. System according to claim 2, wherein the cross-sections of said pistons of said three cylinders and the positions of said solenoid valves in their state of rest are so determined that passage of said solenoid valves to an energized state brought about by a command, causes a rotation of said rocker through an angle corresponding to the selected speed.

\* \* \* \* \*